(12) United States Patent
Jinbo et al.

(10) Patent No.: US 9,371,911 B2
(45) Date of Patent: Jun. 21, 2016

(54) RECIPROCATING SEALING DEVICE (71) Applicant: NOK CORPORATION, Tokyo (JP)

(72) Inventors: Kazunori Jinbo, Kitaibaraki (JP); Hiroki Okada, Kitaibaraki (JP); Toru Araki, Kitaibaraki (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/390,242

(22) PCT Filed: Oct. 15, 2013

(86) PCT No.: PCT/JP2013/077881
§ 371 (c)(1),
(2) Date: Oct. 2, 2014

(87) PCT Pub. No.: WO2014/077071
PCT Pub. Date: May 22, 2014

(65) Prior Publication Data
US 2015/0061233 A1 Mar. 5, 2015

(30) Foreign Application Priority Data

Nov. 16, 2012 (JP) ................................. 2012-251872

(51) Int. Cl.
*F16J 15/56* (2006.01)
*F16J 15/32* (2016.01)
(Continued)

(52) U.S. Cl.
CPC ............... *F16J 15/3204* (2013.01); *F16F 9/36* (2013.01); *F16J 15/18* (2013.01); *F16J 15/20* (2013.01); *F16J 15/32* (2013.01); *F16J 15/3236* (2013.01); *F16J 15/56* (2013.01)

(58) Field of Classification Search
CPC ........... F16J 15/181; F16J 15/24; F16J 15/32; F16J 15/3204; F16J 15/3232; F16J 15/328
See application file for complete search history.

(56) References Cited

U.S. PATENT DOCUMENTS 3,851,888 A    12/1974  Limpson, Jr. et al.
4,102,472 A *   7/1978  Sloan, Jr. ...................... 220/295
(Continued)

FOREIGN PATENT DOCUMENTS

CN          1989363 A     6/2007
CN        101988580 A     3/2011
(Continued)

OTHER PUBLICATIONS

Extended European Search Report for EP 13 85 5379 dated Nov. 10, 2015 (7 pages).

*Primary Examiner* — Kristina Fulton
*Assistant Examiner* — L. Susmitha Koneru
(74) *Attorney, Agent, or Firm* — Harness, Dickey & Pierce, P.L.C.

(57) ABSTRACT

In a reciprocating sealing device sealing two members by mounting a packing to a mounting groove in one of two relatively reciprocating members, and bringing the packing into contact with the other member, the packing is provided with an annular base part, a stationary side lip, and a sliding side lip. A back ring having a lower hardness than the packing is interposed between the annular base part and a groove side surface of the mounting groove. The back ring forms a space region in relation to the other member. The annular base part is provided with a shape that the annular base part does not protrude out of an extension of a peripheral surface of the sliding side lip in a free state by forming a cross sectional shape of a heel part into a circular arc shape or a taper shape.

4 Claims, 4 Drawing Sheets

(51) Int. Cl.
*F16F 9/36* (2006.01)
*F16J 15/18* (2006.01)
*F16J 15/20* (2006.01)

(56) References Cited

U.S. PATENT DOCUMENTS

| | | | | |
|---|---|---|---|---|
| 4,302,020 | A | * | 11/1981 | Morales .................. 277/530 |
| 4,618,154 | A | * | 10/1986 | Freudenthal ............ 277/556 |
| 5,269,537 | A | | 12/1993 | Kiesel |
| 6,007,070 | A | * | 12/1999 | Heathcott et al. ........ 277/510 |
| 6,336,300 | B1 | * | 1/2002 | Babucke ................ 52/396.04 |
| 7,347,290 | B2 | * | 3/2008 | Yu et al. .................. 175/372 |
| 7,568,897 | B2 | * | 8/2009 | Grassbaugh et al. ...... 418/55.5 |
| 7,992,694 | B2 | | 8/2011 | Krause et al. |
| 2007/0216111 | A1 | * | 9/2007 | Matsui .................... 277/647 |
| 2007/0278749 | A1 | * | 12/2007 | Nakanishi et al. ....... 277/567 |
| 2008/0008591 | A1 | | 1/2008 | Krause |

FOREIGN PATENT DOCUMENTS

| | | |
|---|---|---|
| EP | 0052689 A1 | 6/1982 |
| EP | 0902220 A2 | 3/1999 |
| EP | 1826466 A1 | 8/2007 |
| JP | S63-173565 U | 11/1988 |
| JP | H11-199000 A | 7/1999 |
| JP | 2002-122241 A | 4/2002 |
| JP | 2002-174345 A | 6/2002 |
| JP | 2005-147317 A | 6/2005 |
| JP | 2008-525725 A | 7/2008 |
| JP | 2010-255698 A | 11/2010 |

* cited by examiner

RECIPROCATING SEALING DEVICE

CROSS-REFERENCE TO RELATED APPLICATIONS

This application is a U.S. National Stage Application of International Application No. PCT/JP2013/077881 filed on Oct. 15, 2013, and published in Japanese as WO 2014/077071 A1 on May 22, 2014. This application claims priority to Japanese Application No. 2012-251872 filed on Nov. 16, 2012. The entire disclosures of the above applications are incorporated herein by reference.

BACKGROUND OF THE INVENTION

1. Field of the Invention

The present invention relates to a sealing device relating to a seal technology, and more particularly to a reciprocating sealing device. The sealing device according to the present invention is used, for example, in a damper mechanism for a motor vehicle, or used in the other damper mechanisms.

2. Description of the Conventional Art

Figure 6:
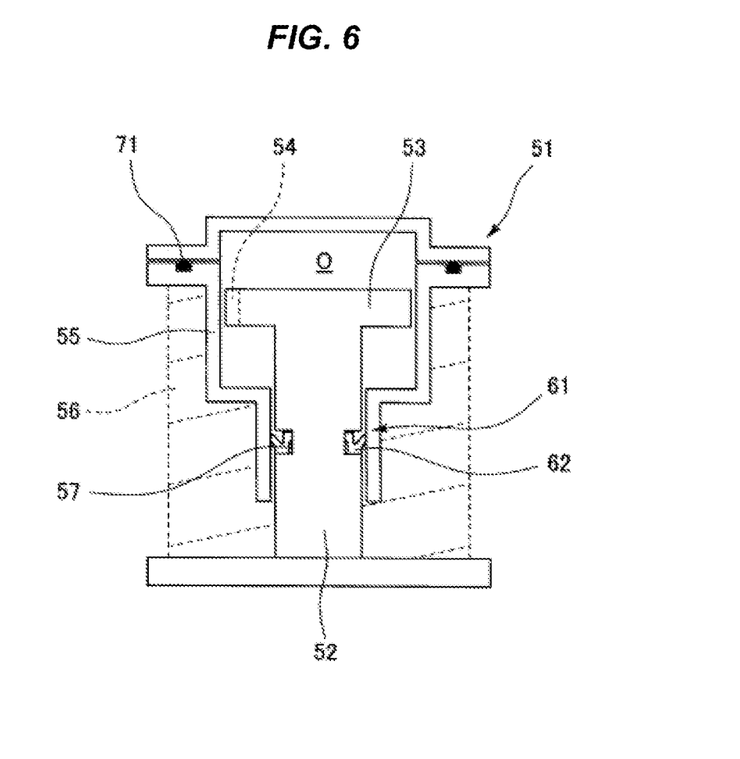
FIG. 6 is an explanatory view of a damper mechanism.

A damper mechanism 51 shown in FIG. 6 has been conventionally known, and a sealing device 61 is embedded in the damper mechanism 51 for sealing an oil O which is sealed in an inner portion.

The shown damper mechanism 51 is structured by combining a damper shaft 52 which is provided in a leading end with a piston 53 having an orifice 54, and a damper case 55 which is elastically supported by a spring means 56, and a sealing device 61 is embedded between the damper shaft 52 and the damper case 55 for sealing the oil O sealed in an inner portion of the damper case 55. Further, a seal 71 constructed by an O-ring or a gasket is mounted separately at a split position of the damper case 55 so as to seal the split position.

Figure 7:
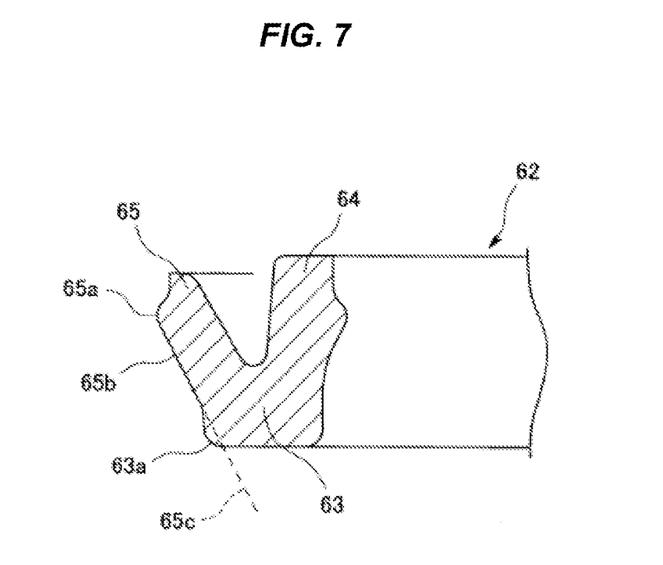
FIG. 7 is a cross sectional view of a substantial part of a packing which is provided in a sealing device according to a conventional example.

The sealing device 61 embedded between the damper shaft 52 and the damper case 55 is provided with a packing 62 which is mounted to an annular mounting groove 57 arranged in an outer peripheral surface of the damper shaft 52, and the packing 62 is integrally provided with an annular base part 63, a stationary side lip 64 which comes into close contact with a groove bottom surface of the mounting groove 57, and a sliding side lip 65 which slidably comes into close contact with an inner peripheral surface of a tubular portion of the damper case 55, as shown in FIG. 7.

However, the following problems are pointed out in the prior art mentioned above.

(1) A volume of the oil is going to be small at a collapsing margin of the seal 71 by the damper case 55 at the oil sealing time (at the damper assembling time, however, since the oil is an incompressible fluid, the volume of the oil is absorbed by deformation of the packing 62.

(2) The volume of the oil which can not be absorbed by the deformation of the packing 62 causes an increase of an internal pressure.

(3) In the structure of the packing 62, an annular base part 63 is formed such that a cross sectional shape of a heel part 63a is an angled end, and is formed such that the annular base part 63 protrudes to the damper case 55 (an outer peripheral side, a left side in the drawing) from an extension 65c of an outer peripheral surface 65b of the sliding side lip 65 in a free state.

(4) According to the packing 62 having the structure mentioned above, the packing 62 slides in a full-surface contact state on the basis of the increase of the internal pressure. Here, the full-surface contact means that the packing 62 comes into contact with the damper case 55 over a whole surface between a lip end 65a of the sliding side lip 65 and the heel part 63a of the annular base part 63. Further, the internal pressure further increases on the basis of a viscous resistance of the oil by the reciprocating motion.

(5) According to the phenomena and structures (1) to (4) mentioned above, a large amount of oil leakage may be generated in the case that a high-frequency oscillation is input and a high-viscosity oil is used.

Further, as a prior art in relation to the present invention, there is the invention disclosed in Japanese Unexamined Patent Publication No. 2002-122241. The prior invention relates to "a packing for fluid pressure having an annular seal groove part which receives fluid pressure, an annular sliding side lip which is pressed to a sliding member by the fluid pressure, an annular heel part which faces to an opening end side of an attaching groove, an annular shoulder part which faces to a corner portion side of the attaching groove, and an annular fixed side lip which is pressed to a bottom surface of the attaching groove by the fluid pressure, wherein the packing for fluid pressure has an annular first inclined surface which is inclined from a leading end of the sliding side lip to the heel part in a free state in which the fluid pressure is not applied, so as to be away from the sliding member little by little, and the heel part is continuously curved from the first inclined surface".

Accordingly, differences between the prior invention and the present invention are as follows.

(a) Since the prior invention starts deforming from the lip, the prior invention is disadvantageous to maintain a wedge shape. On the contrary, the present invention has a collapsing margin of the back ring, the lip shape can be maintained even after absorbing the initial internal pressure.

(b) Since the present invention is easily deformed only in the sliding side lip by the back ring, the deformation of the stationary side lip is hard to be generated, and stability of the seal is improved.

(c) Since the volume of the non-sealed area is increased by the back ring in the present invention, an allowable amount of the volume change is increased. Therefore, it is possible to stand against the increase of the internal pressure (the increase of the volume) at the using time.

SUMMARY OF THE INVENTION

Problem to be Solved by the Invention

The present invention is made by taking the above points into consideration, and an object of the present invention is to provide a reciprocating sealing device which is provided with a shape or a structure in which a packing is hard to be full-surface contact even in the case that an internal pressure is increased, by improving a volume absorbing performance, whereby an excellent sealing performance can be achieved.

Means for Solving the Problem

In order to achieve the object mentioned above, a reciprocating sealing device according to a first aspect of the present invention is a reciprocating sealing device comprising:

two members which relatively perform a reciprocating motion;

mounting groove which is provided in one member of the two members;

a packing which is mounted to the mounting groove; and the packing sealing between the two members by slidably coming into close contact with the other member, wherein the packing is integrally provided with an annular base part, a stationary side lip which comes into close contact with a groove bottom surface of the mounting groove, and a sliding side lip which slidably comes into close contact with the other member, and wherein a back ring made of a material having a lower hardness than the packing is interposed between an end surface of the annular base part in the packing and a low pressure side groove side surface of the mounting groove, the back ring forms a space region in relation to the other member, the annular base part in the packing is provided with a shape that the annular base part does not protrude to the other member side from an extension of a peripheral surface of the sliding side lip in a free state by forming a cross sectional shape of a heel part from a peripheral surface facing to the other member to an end surface into a circular arc shape.

Further, a reciprocating sealing device according to a second aspect of the present invention is a reciprocating sealing device comprising:

two members which relatively perform a reciprocating motion;

mounting groove which is provided in one member of the two members;

a packing which is mounted to the mounting groove; and the packing sealing between the two members by slidably coming into close contact with the other member, wherein the packing is integrally provided with an annular base part, a stationary side lip which comes into close contact with a groove bottom surface of the mounting groove, and a sliding side lip which slidably comes into close contact with the other member, and wherein a back ring made of a material having a lower hardness than the packing is interposed between an end surface of the annular base part in the packing and a low pressure side groove side surface of the mounting groove, the back ring forms a space region in relation to the other member, the annular base part in the packing is provided with a shape that the annular base part does not protrude to the other member side from an extension of a peripheral surface of the sliding side lip in a free state by forming a cross sectional shape of a heel part from a peripheral surface facing to the other member to an end surface into a taper shape.

Further, a reciprocating sealing device according to a third aspect of the present invention is the reciprocating sealing device described in the first aspect or the second aspect mentioned above, wherein the end surface of the annular base part in the packing is provided with a flat part formed into an axially vertical plane, at least in a range coming into contact with the back ring.

Further, a reciprocating sealing device according to a fourth aspect of the present invention is the reciprocating sealing device described in the first aspect, the second aspect or the third aspect mentioned above, wherein the back ring is constructed by an O-ring.

In the sealing device according to the present invention provided with the structure mentioned above, since the back ring made of the material having the lower hardness than the packing is embedded in addition to the packing, the back ring deforms (in an axial direction) in advance of the packing against the internal pressure which is generated, for example, at the damper assembling time so as to reduce the deformation of the packing against the internal pressure, and the volume absorbing performance is widely improved at the degree that the back ring deforms.

Further, since the space region is formed between the back ring and the other member, the back ring does not come into contact with the other member even in the case that the back ring compression deforms in the axial direction and is enlarged in a diametrical direction. Therefore, it is possible to prevent the oil from being scraped out and leaking by the back ring at the reciprocating time.

An O-ring constructed by a rubber-like elastic body is used, for example, as the back ring.

Further, in the basic structure in which the packing is provided integrally with the annular base part, the stationary side lip and the sliding side lip, the annular base part has the shape that the volume is reduced in the heel part in comparison with the conventional structure, that is, the annular base part has the shape that the annular base part does not protrudes to the other member side from the extension of the peripheral surface of the sliding side lip in the free state by forming the cross sectional shape of the heel part from the peripheral surface facing to the other member to the end surface into the circular arc shape or the taper shape. Therefore, a comparatively greater space region is formed so as to be positioned closer to the other member side of the annular base part, and room for absorbing the deformation of the packing is generated. Further, in addition, in the sealing device according to the present invention, the space region is formed between the back ring and the other member as mentioned above. Therefore, the room for absorbing the deformation of the packing is generated here. Accordingly, the great space region is formed within the mounting groove when the packing and the back ring are mounted to the mounting groove. As a result, since the deformation of the packing can be easily absorbed, and the volume absorbing performance is improved, it is possible to inhibit the packing from being full-surface contacted with the other member.

Further, since the flat part formed into the axially vertical plane is provided in the end surface of the annular base part in the packing, the contact state with the back ring is stabilized, and it is easy to maintain the initial shape of the packing. The range of the flat part is preferably set to a degree that any local deformation is not generated in the contact portion with the back ring due to the internal pressure, for example, generated at the damper assembling time.

EFFECT OF THE INVENTION

The present invention achieves the following effects.

More specifically, in the present invention, since the back ring constructed by the O-ring deforming in advance of the packing is embedded as described above, it is possible to reduce the deformation of the packing and it is possible to widely improve the volume absorbing performance. Further, since the space region is formed between the back ring and the other member, it is possible to prevent the oil scraping-out and leakage at the reciprocating time. Further, the annular base part of the packing has the shape that the annular base part does not protrude to the other member side from the extension of the peripheral surface of the sliding side lip in the free state by forming the cross sectional shape of the heel part into the circular arc shape or the taper shape, and the space region is formed between the back ring and the other member. Therefore, the comparatively greater space region is formed within the mounting groove when the packing and the back ring are mounted to the mounting groove. Accordingly, since the deformation of the packing can be easily absorbed by utilizing the comparatively greater space region and the volume absorbing performance is improved, it is possible to inhibit the packing from being full-surface contacted with the other member when the high pressure is applied to the packing. As a result, it is possible to inhibit the problems such as the reduction of the seal surface pressure and the oil scraping-out by the packing from being generated, and it is possible to improve the sealing performance of the packing, and further of the sealing device. Further, since the flat part formed into the axially vertical plane is provided in the end surface of the annular base part, the contact state with the back ring is stabilized, and it is easy to maintain the initial shape of the packing.

DETAILED DESCRIPTION OF PREFERRED EMBODIMENTS

Next, a description will be given of embodiments according to the present invention with reference to the accompanying drawings.

Figure 1:
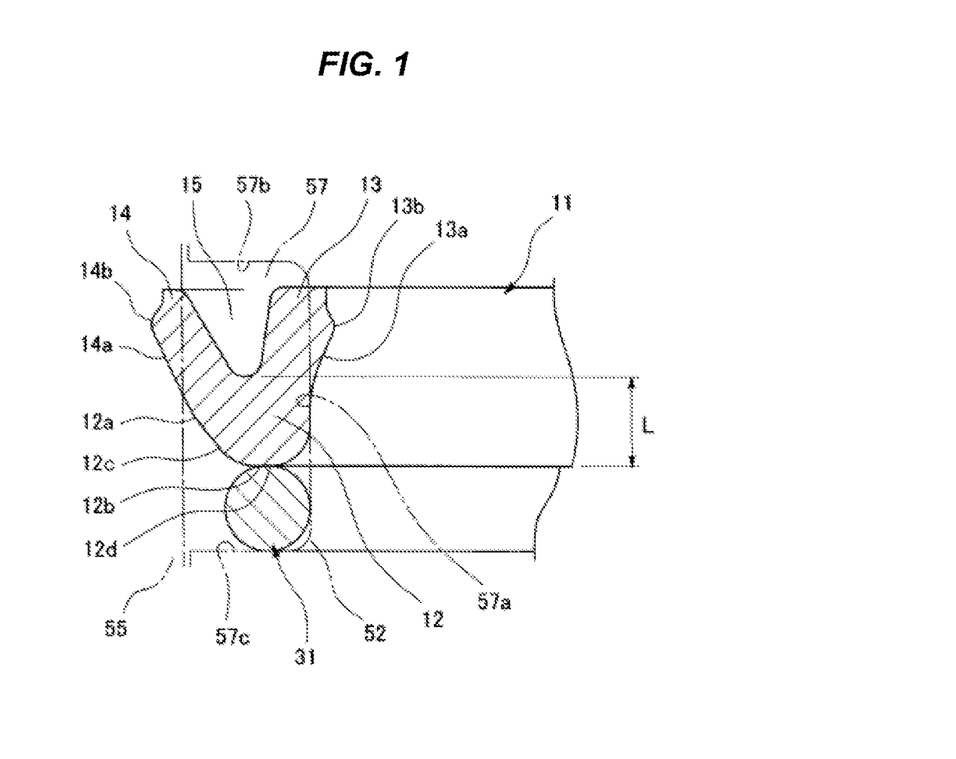
FIG. 1 is a cross sectional view of a substantial part of a packing and a back ring which are provided in a sealing device according to an embodiment of the present invention.

FIG. 1 shows a cross section of a substantial part of a packing 11 and a back ring 31 which are provided in a sealing device according to an embodiment of the present invention. The packing 11 and the back ring 31 are mounted to an annular mounting groove 57 which is, for example, provided in an outer peripheral surface of a damper shaft 52 in a damper mechanism 51 in FIG. 6, and a reciprocating (axially reciprocating) sealing device is accordingly constructed. The damper mechanism 51 is constructed by combining a damper shaft (one member in the first aspect) 52 which is provided in a leading end with a piston 53 having an orifice 54, and a damper case (the other member in the first aspect) 55 which is elastically supported by a spring means 56 as mentioned above, and a sealing device is embedded between the damper shaft 52 and the damper case 55 so as to seal oil O which is sealed in an inner portion of the damper case 55. The mounting groove 57 is provided with a groove bottom surface 57a which is formed into a cylindrical surface shape, a high pressure side (oil side) groove side surface 57b which is formed into an axially vertical plane, and a low pressure side (atmospheric air side) groove side surface 57c which is formed into an axially vertical plane in the same manner, as shown in FIG. 1, and is formed into a rectangular cross sectional shape.

The packing 11 is provided with an annular base part 12 having a predetermined axial length L, and an annular stationary side lip 13 and an annular sliding side lip 14 are integrally formed in the annular base part 12, the annular stationary side lip 13 coming into close contact with the groove bottom surface 57a of the mounting groove 57, and the annular sliding side lip 14 slidably coming into close contact with an inner peripheral surface of a tubular portion of the damper case 55. The stationary side lip 13 is formed diagonally toward an inner side (a groove bottom surface side) in a diametrical direction in one side (a high pressure side) in an axial direction from the annular base part 12, and is provided at one position in the axial direction in the inner peripheral surface 13a with an annularly protruding lip end 13b for locally enhancing the seal surface pressure. On the other hand, the sliding side lip 14 is formed diagonally toward an outer side (a case side) in the diametrical direction in one side (the high pressure side) in the axial direction from the annular part 12, and is provided at one position in the axial direction in the outer peripheral surface 14a with an annularly protruding lip end 14b for locally enhancing the seal surface pressure. An annular pressure receiving groove 15 is formed between both the lips 13 and 14.

Further, the packing 11 is provided with the following characteristic structures.

Figure 2:
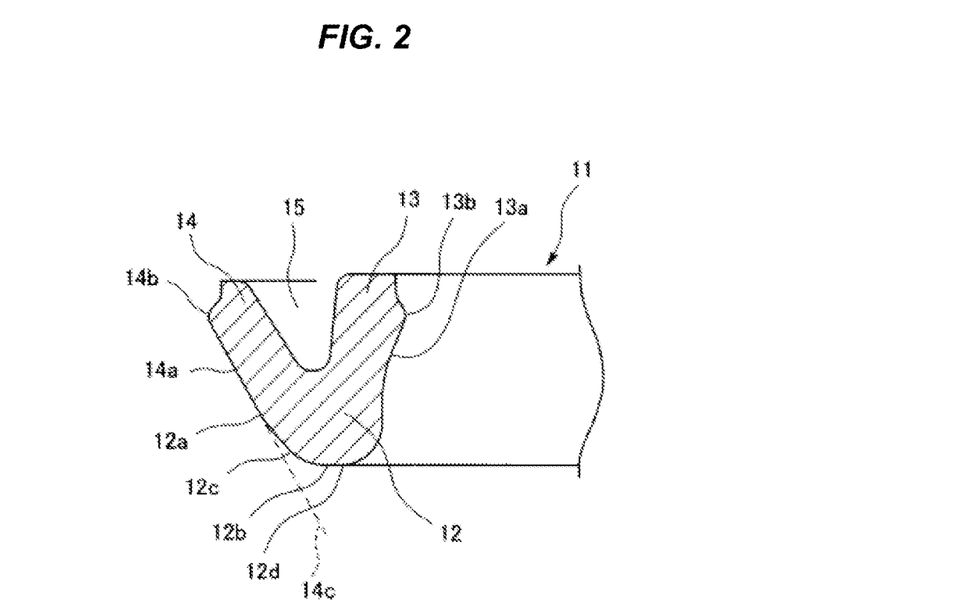
FIG. 2 is a cross sectional view of the substantial part of the packing.

More specifically, as shown in FIG. 2, the annular base part 12 in the packing 11 is provided with a shape that the annular base part 12 does not protrude to the damper case 55 (the outer peripheral side, the left side in FIG. 1) from an extension 14c of the outer peripheral surface 14a of the sliding side lip 14 in a free state, by forming a cross sectional shape of a heel part 12c from an outer peripheral surface 12a toward the other (low pressure side) end surface 12b in the axial direction into a circular arc shape. In other words, the cross sectional shape of the heel part 12c from the outer peripheral surface 12a of the annular base part 12 toward the end surface 12b is formed into the circular arc shape, so as to prevent the annular base part 12 from protruding toward the damper case 55 from the extension 14c of the outer peripheral surface 14a of the sliding side lip 14 in the free state. The outer peripheral surface 12a of the annular base part 12 faces to the inner peripheral surface of the damper case 55 via a predetermined diametrical gap. Since the outer peripheral surface 14a of the sliding side lip 14 in the free state is formed into a taper (circular conical surface) shape and formed into a linear cross sectional shape, the extension 14c thereof is also formed into the taper shape and formed into the linear cross sectional shape. However, the outer peripheral surface 14a of the sliding side lip 14 may be formed into a circular arc cross sectional shape or formed into a curved shape. In this case, the extension 14c is also formed into the circular arc shape or the curved shape.

Further, the other end surface 12b in the axial direction of the annular base part 12 is provided with an annular flat part 12d formed into an axially vertical plane, in a range in which the other end surface 12b comes into contact with the back ring 31.

Figure 3:
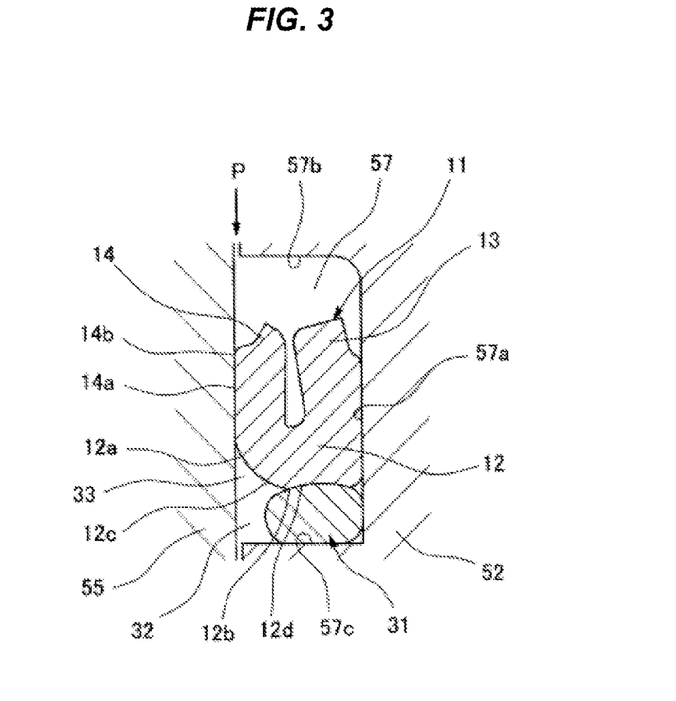
FIG. 3 is a cross sectional view of the substantial part of the sealing device.

On the other hand, the back ring 31 is constructed by an O-ring which is made of a rubber-like elastic material, and is interposed between the flat part 12d which is provided in the end surface 12b of the annular base part 12 in the packing 11 and the low pressure side groove side surface 57c of the mounting groove 57 as shown in FIG. 1. The hardness of the back ring 31 is set to be lower than the packing 11. Further, an outer diameter of the back ring 31 is set to be smaller than an inner diameter of the damper case 55 and an outer diameter of the damper shaft 57. As a result, in the case that the back ring 31 is mounted to the mounting groove 57, an annular space region 32 is formed between the back ring 31 and the damper case 55 as shown in FIG. 3. Further, an inner diameter of the back ring 31 is set to be equal or approximately equal to a diameter of the groove bottom surface 57a of the mounting groove 57, however, may be set to be larger than the diameter of the groove bottom surface. In this case, an annular space region is formed between the back ring 31 and the groove bottom surface 57a.

A state shown in FIG. 3 is established by mounting the packing 11 and the back ring 31 having the structure mentioned above to the mounting groove 57, and the following operations and effects can be achieved by the sealing device.

More specifically, in the sealing device having the structure mentioned above, since the back ring 31 constructed by the O-ring made of the rubber-like elastic material having the lower hardness than the packing 11 is embedded in addition to the packing 11, the back ring 31 elastically deforms in advance of the packing 11 against the internal pressure which is generated at the damper assembling time. Therefore, it is possible to reduce an amount of elastic deformation of the packing 11 against the internal pressure, and it is possible to widely improve a volume absorbing performance (a pressure absorbing performance on the basis of reduction of volume (sum of the volume of the packing 11 and the volume of the space region 17)) in the sealing device, at an elastic deforming amount of the back ring 31.

Figure 4:
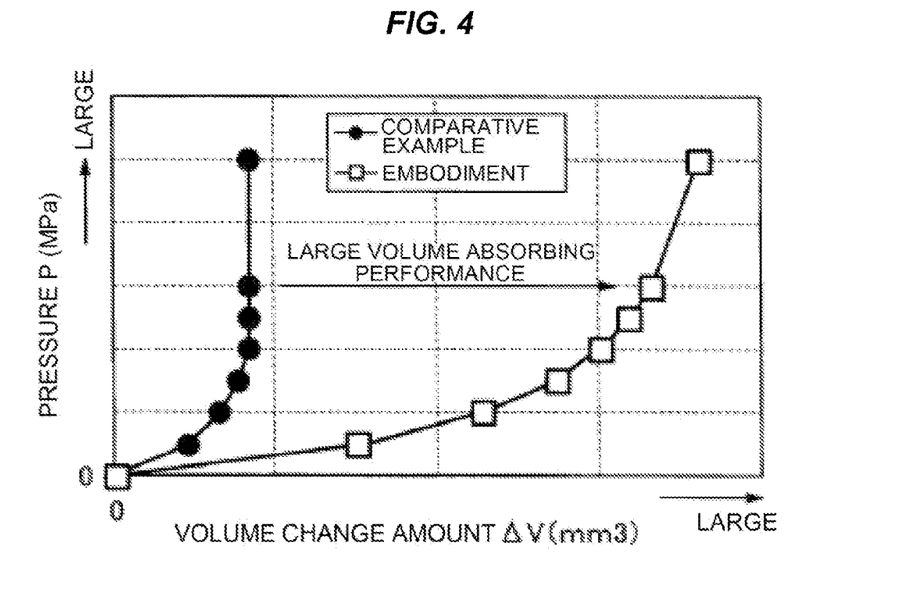
FIG. 4 is a comparative graph showing a relationship between a pressure and a volume change amount in the sealing devices according to a comparative example and the embodiment of the present invention.

FIG. 4 is a comparative graph showing a relationship between a pressure and a volume change amount in the sealing devices according to a comparative example and the embodiment mentioned above. ● plot shows the comparative example which is constructed only by the packing 11, and ☐ plot shows the embodiment mentioned above which is constructed by the combination of the packing 11 and the back ring 31. According to the sealing device having the above-mentioned structure, it is possible to widely improve the volume absorbing performance as shown in the graph.

Further, in the sealing device having the above-mentioned structure, since the annular space region 32 is formed between the back ring 31 and the damper case 55, the back ring 31 does not come into contact with the damper case 55 even in the case that the back ring 31 compression deforms in the axial direction and is enlarged in the diametrical direction. Therefore, it is possible to prevent the oil scraping-out and leaking at the reciprocating time due to the contact of the back ring 31 with the damper case 55.

Further, since the annular base part 12 of the packing 11 is provided with the shape that the annular base part 12 does not protrude to the damper case 55 from the extension 14c of the outer peripheral surface 14a of the sliding side lip 14 in the free state, by forming the cross sectional shape of the heel part 12c into the circular arc shape, a comparatively great space region 33 is formed so as to be positioned in the damper case 55 side (the outer peripheral side) of the annular base part 12, and room for absorbing the elastic deformation of the packing 11 is generated here. Further, since the space region 32 is in addition formed between the back ring 31 and the damper case 55 as mentioned above, room for absorbing the elastic deformation of the packing 11 is also generated here. Therefore, the space regions 32 and 33 formed within the mounting groove 57 when the packing 11 is mounted to the mounting groove 57 become great. Accordingly, since the elastic deformation of the packing 11 is easily absorbed and the volume absorbing performance is improved, it is possible to inhibit the packing 11 from full-surface contacting with the damper case 55. Therefore, it is possible to suppress generation of problems such as the reduction of the seal surface pressure and the scraping-out of the oil by the packing 11, and it is possible to improve the sealing performance of the packing 11, and further of the sealing device.

Figure 8:
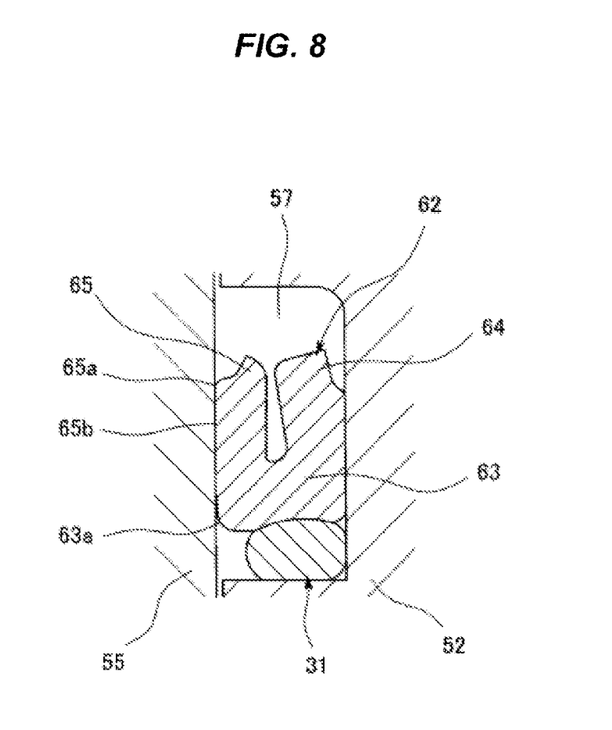
FIG. 8 is a cross sectional view of a substantial part of a sealing device according to a comparative example.

As a comparative example, FIG. 8 shows a sealing device constructed by combination of the packing 62 shown in FIG. 7 and the back ring 31. In this sealing device, the packing 11 irregularly deforms as shown and full-surface contacts with the damper case 55. Therefore, a sufficient sealing performance can not be achieved.

Further, in the sealing device having the structure mentioned above, since the flat part 12d formed into the axially vertical plane is provided in the end surface 12b of the annular base part 12 in the packing 11, it is possible to stabilize the contact state with the back ring 31, and it is possible to easily maintain the initial shape of the packing 11.

In the embodiment of the present invention, the following matters can be additionally described.

Figure 5:
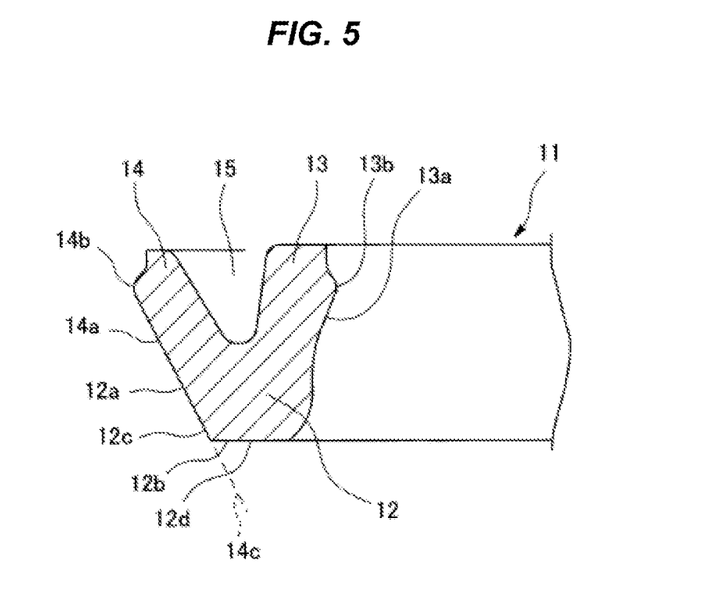
FIG. 5 is a cross sectional view of a substantial part of a packing which is provided in a sealing device according to the other embodiment of the present invention.

(a) In the embodiment mentioned above, the cross sectional shape of the heel part 12c is set to the circular arc shape which is constructed by the curved line, however, may be alternatively set to the taper (circular cone surface) shape as shown in FIG. 5. In the example in FIG. 5, the cross sectional line of the heel part 12c is arranged on the extension 14c of the outer peripheral surface 14a of the sliding side lip 14 in the free state (an angle of incline of the heel part 12c in relation to a packing center axis is set to be the same as an angle of incline of the outer peripheral surface 14a of the sliding side lip 14). However, the angle of incline of the heel part 12c may be larger than the angle of incline of the outer peripheral surface 14a of the sliding side lip 14 (can not be smaller since the heel part 12c protrudes out of the extension 14c).

(b) The material of the packing 11 may be a seal material such as urethane in addition to the rubber.

(c) In the embodiment mentioned above, the back ring 31 is constructed by the O-ring and the cross sectional shape of the back ring 31 is formed into the circular shape, however, the cross sectional shape of the back ring 31 is not limited to this, but may be formed, for example, into a rectangular shape, a rhombic shape or a triangular shape. However, the O-ring has advantages that the O-ring can obtain an appropriate elasticity, have a good shape stability and be easily available.

(d) In the embodiment mentioned above, the packing 11 and the back ring 31 are mounted to the mounting groove 57 which is provided in the outer peripheral surface of the damper shaft 52, however, may be alternatively mounted to the mounting groove 57 which is provided in an inner peripheral surface of the damper case 55. In this case, the mounting groove 57 is open toward the inner side in the diametrical direction, and the packing 11 is structured such that the stationary side lip 13 is arranged in the outer peripheral side and the sliding side lip 14 is arranged in the inner peripheral side. Further, the damper 55 corresponds to one member in the first aspect and the damper shaft 52 corresponds to the other member.

What is claimed is:

1. A reciprocating sealing device comprising:
   first and second members which relatively perform a reciprocating motion;
   a mounting groove which is provided in said first member;
   a packing which is mounted to the mounting groove; and
   said packing sealing between said first and second members by slidably coming into close contact with said second member,
   wherein said packing is integrally provided with an annular base part, a stationary side lip diagonally projecting from said base part and which comes into close contact with a groove bottom surface of said mounting groove, and a sliding side lip diagonally projecting from said annular base part and which slidably comes into close contact with said second member such that said packing is V-shaped in cross-section,
   wherein a first lip end annularly projects from said stationary side lip, and a second lip end annularly projects from said sliding side lip, said first and second lip ends being configured to locally enhance seal surface pressure, and wherein a back ring made of a material having a lower hardness than said packing directly abuttingly engages an end surface of the annular base part of said packing and directly abuttingly engages a low pressure side groove side surface of said mounting groove, said back ring forms an open space region extending from said back ring to said second member, said annular base part does not protrude to said second member side from an extension of a conical surface of said sliding side lip in a free state, said conical surface extending from said second lip end toward said end surface, said annular base part including:
  an annular flat part along said end surface where said end surface comes into contact with said back ring, and
  a heel part extending from said conical surface facing said second member to said annular flat part, said heel part having a circular arc shape, and
an outer diameter of said back ring is smaller than an inner diameter of said second member and an outer diameter of said first member.

2. A reciprocating sealing device comprising:
first and second members which relatively perform a reciprocating motion;
mounting groove which is provided in said first member;
a packing which is mounted to the mounting groove; and
said packing sealing between said first and second members by slidably coming into close contact with said second member,
wherein said packing is integrally provided with an annular base part, a stationary side lip diagonally projecting from said base part and which comes into close contact with a groove bottom surface of said mounting groove, and a sliding side lip diagonally projecting from said annular base part and which slidably comes into close contact with said second member such that said packing is V-shaped in cross-section, wherein a first lip end annularly projects from said stationary side lip, and a second lip end annularly projects from said sliding side lip, said first and second lip ends being configured to locally enhance seal surface pressure, and wherein a back ring made of a material having a lower hardness than said packing directly abuttingly engages an end surface of the annular base part of said packing and directly abuttingly engages a low pressure side groove side surface of said mounting groove, said back ring forms an open space region extending from said back ring to said second member, said annular base part does not protrude to said second member side from an extension of a peripheral surface of said sliding side lip in a free state, said annular base part including:
  an annular flat part along said end surface where said end surface comes into contact with said back ring, and
  a heel part extending from a peripheral surface facing said second member to said annular flat part, said heel part having a taper shape, and
an outer diameter of said back ring is smaller than an inner diameter of said second member and an outer diameter of said first member.

3. The reciprocating sealing device according to claim 1, wherein the flat part is formed into an axially vertical plane, at least in the range coming into contact with said back ring.

4. The reciprocating sealing device according to claim 2, wherein the flat part is formed into an axially vertical plane, at least in the range coming into contact with said back ring.

* * * * *